March 17, 1953   R. R. RICHARDSON ET AL   2,631,642
BOX SEALING METHOD AND APPARATUS
Filed July 22, 1949   10 Sheets-Sheet 1
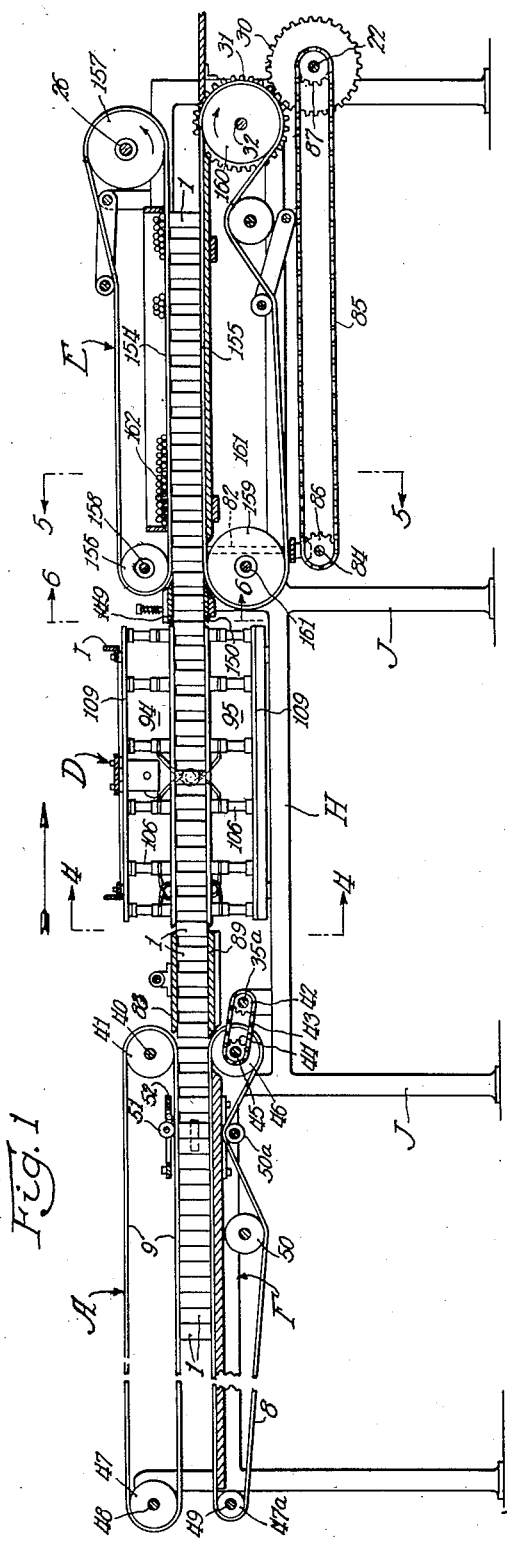
Inventors:
Ralph R. Richardson
Walter T. Ritter
Robert O. Ragan
and Don W. Coy
By: Soans, Pond + Anderson Attys.

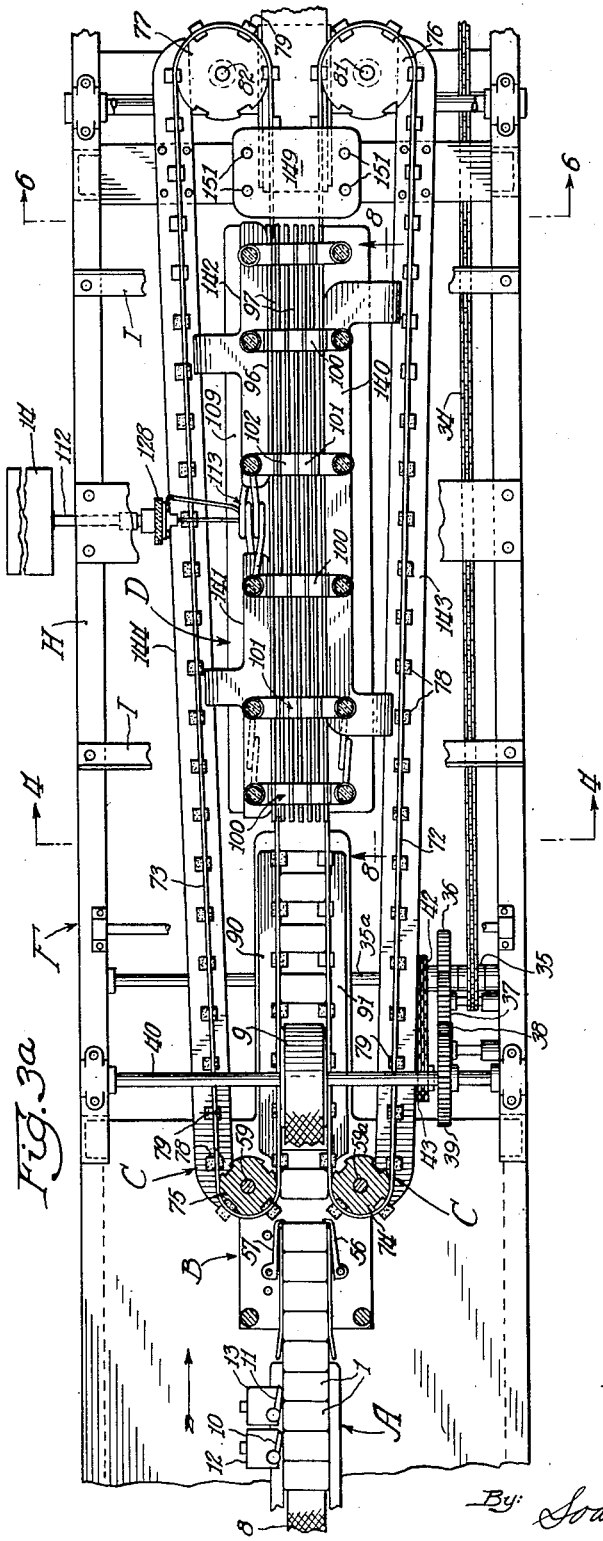

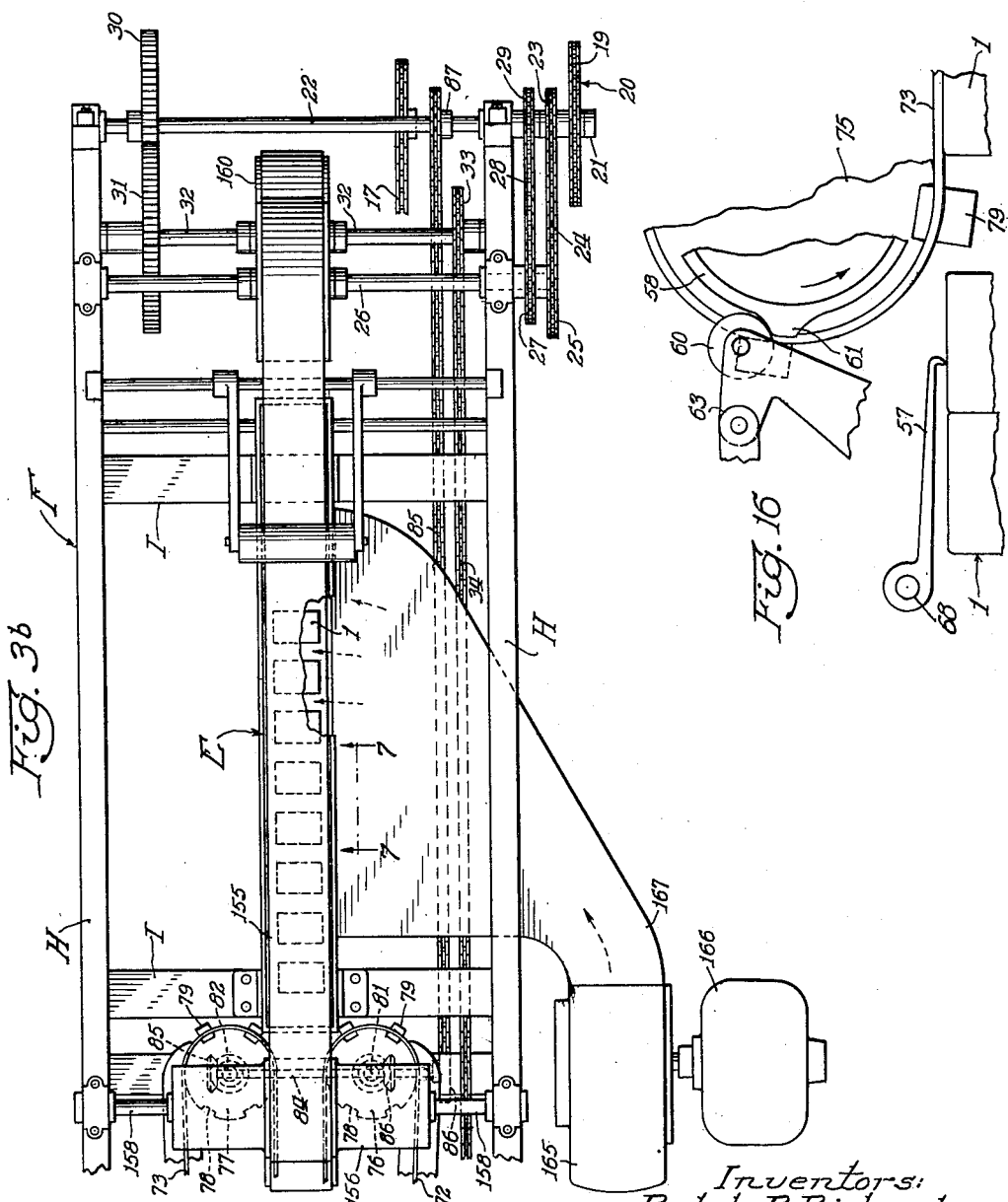

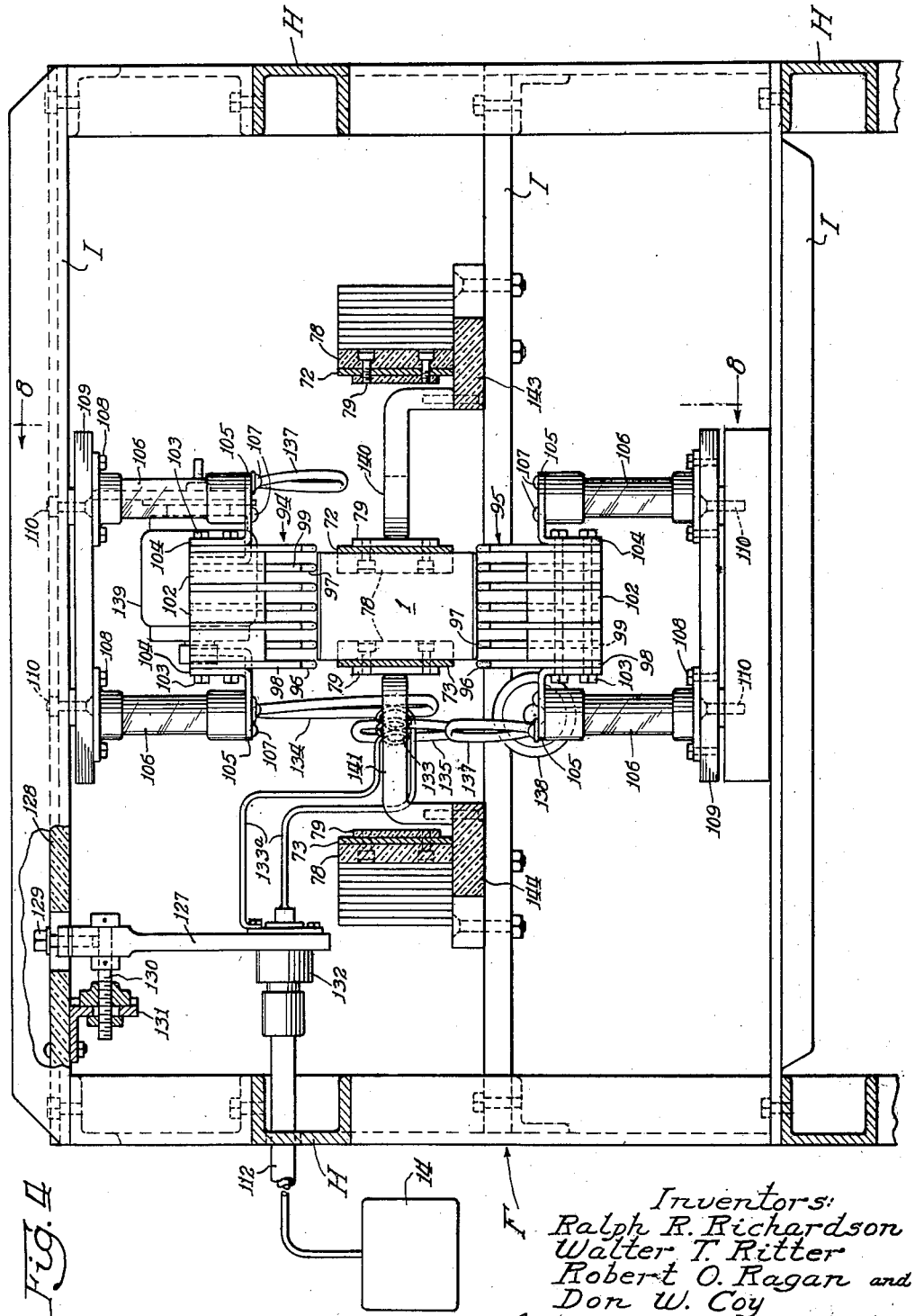

March 17, 1953  R. R. RICHARDSON ET AL  2,631,642
BOX SEALING METHOD AND APPARATUS
Filed July 22, 1949  10 Sheets-Sheet 5
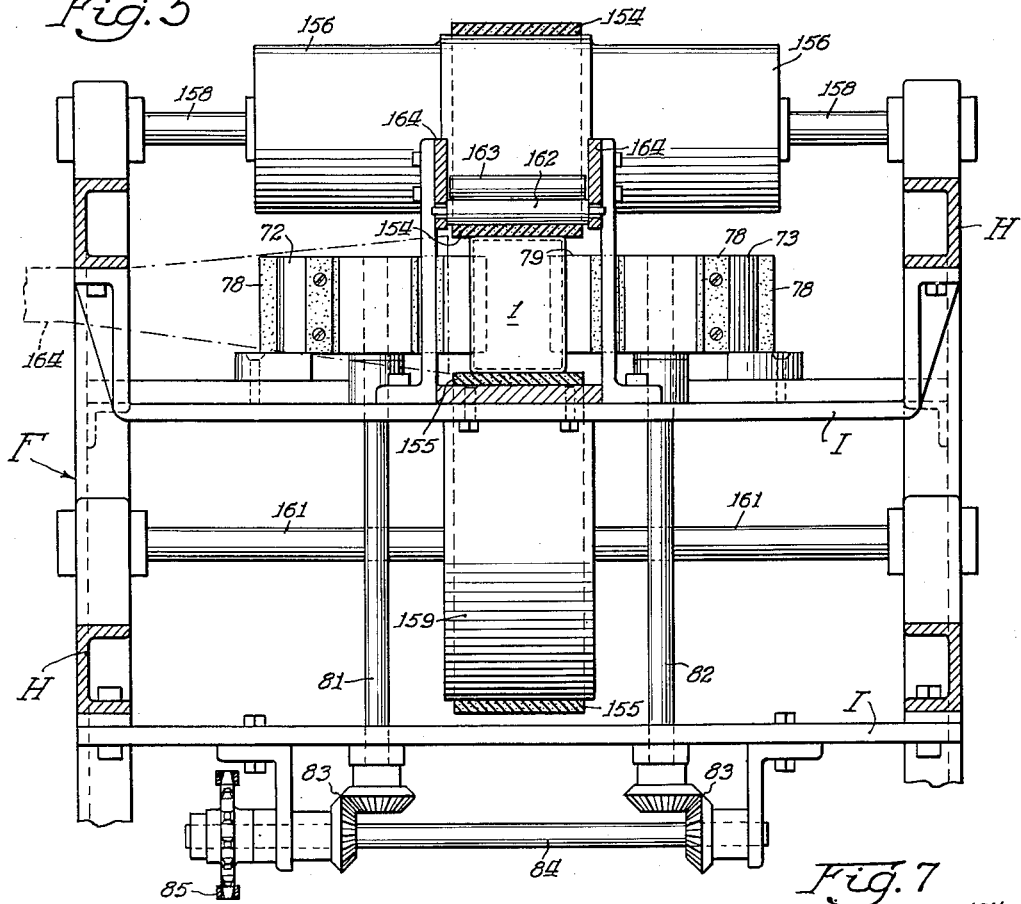
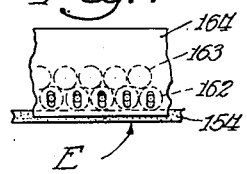
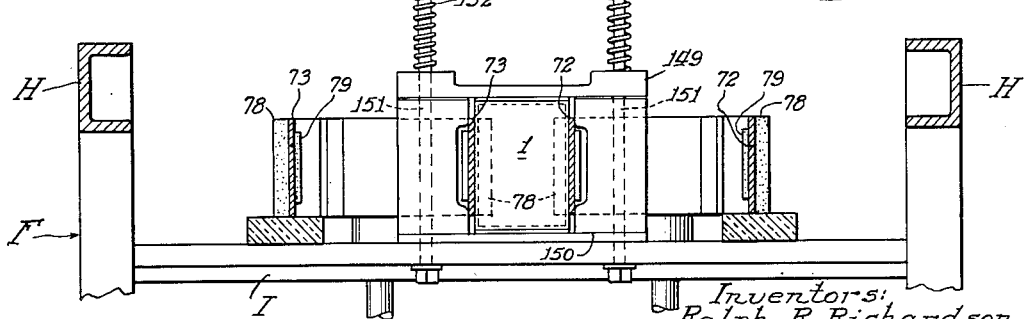
Inventors:
Ralph R. Richardson
Walter T. Ritter
Robert O. Ragan
and Don W. Coy
By: Soans, Pond + Anderson Attys

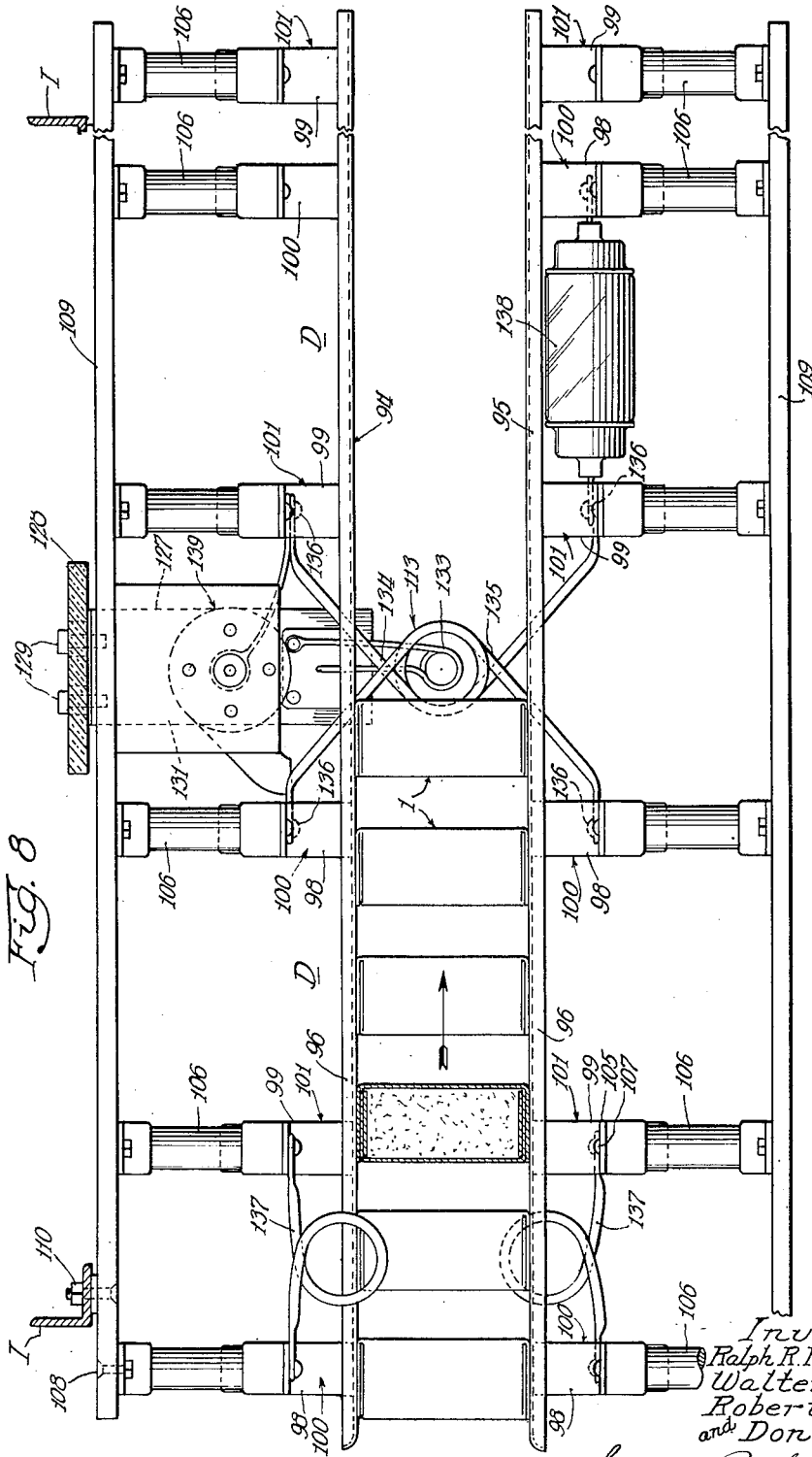

March 17, 1953 R. R. RICHARDSON ET AL 2,631,642
BOX SEALING METHOD AND APPARATUS
Filed July 22, 1949 10 Sheets-Sheet 7

Inventors:
Ralph R. Richardson
Walter T. Ritter
Robert O. Ragan and
Don W. Coy
By Evans, Pond & Anderson
Attys

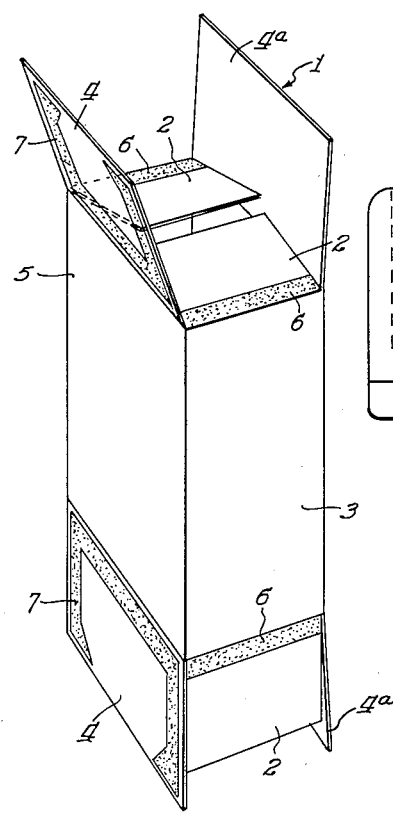
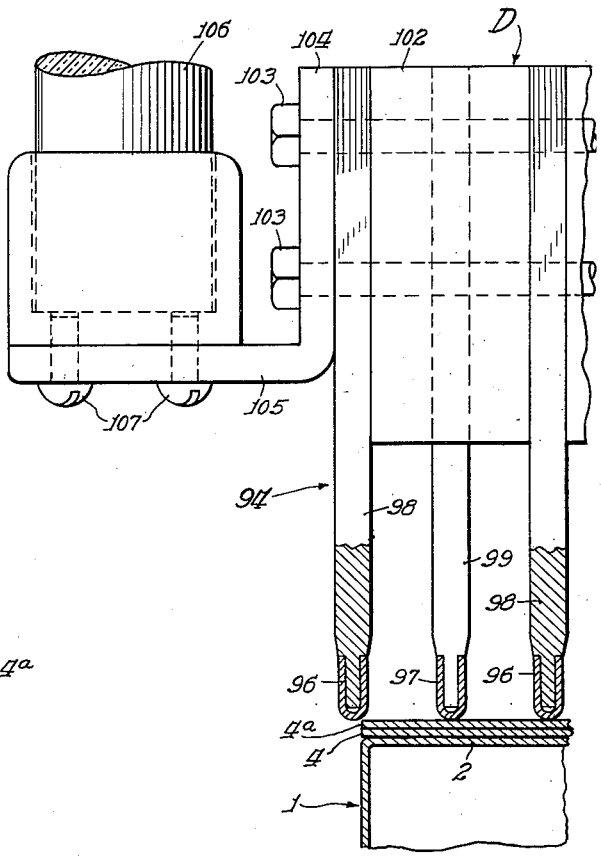
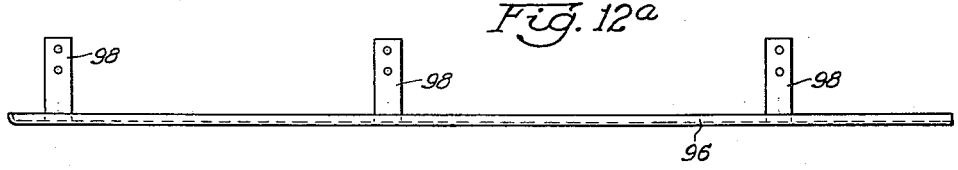

March 17, 1953   R. R. RICHARDSON ET AL   2,631,642
BOX SEALING METHOD AND APPARATUS
Filed July 22, 1949   10 Sheets-Sheet 9

Inventors:
Ralph R. Richardson
Walter T. Ritter
Robert O. Ragan
and Don W. Coy
By: Soans, Pond & Anderson Attys March 17, 1953 R. R. RICHARDSON ET AL 2,631,642
BOX SEALING METHOD AND APPARATUS
Filed July 22, 1949 10 Sheets-Sheet 10

Inventors:
Ralph R. Richardson
Walter T. Ritter
Robert O. Ragan
and Don W. Coy
By: Evans, Pond & Anderson
Attys.

Patented Mar. 17, 1953

2,631,642

UNITED STATES PATENT OFFICE 2,631,642

BOX SEALING METHOD AND APPARATUS

Ralph R. Richardson, Chicago, Walter T. Ritter, River Forest, Robert O. Ragan, Oak Park, and Don W. Coy, Chicago, Ill., assignors to Chicago Carton Company, Chicago, Ill., a corporation of Delaware Application July 22, 1949, Serial No. 106,218

17 Claims. (Cl. 154—1)

This invention relates in general to automatic package sealing apparatus, and more particularly, to automatic apparatus adapted for the rapid and automatic sealing of packages, cartons, boxes and the like.

The main objects of this invention are to provide an improved automatic package sealing machine which will effectively seal boxes, cartons or the like by the application of high frequency electric currents to thermo-plastic sealing material coated on portions of the article to be sealed; to provide equipment for simultaneously effecting the heat sealing of several surfaces of the package without subjecting the contents of the package to heating; to provide a sealing machine for boxes, cartons, packages and the like which will effectively operate at high speeds and which can be maintained in continuous operation at an extremely low cost, and to provide an improved sealing machine of the aforedescribed type which is durable and efficient in use, simple and easy to manufacture, and marketable at a reasonable cost.

In the drawings,

Fig. 1 is a longitudinal cross section of a machine embodying a selected form of the invention;

Fig. 2 is a side elevation of a portion of the machine;

Figs. 3a and 3b are top plan views respectively of the left and right hand portions of the machine as shown in Fig. 1, parts being broken away to more clearly show certain details in Fig. 3a;

Figure 15:
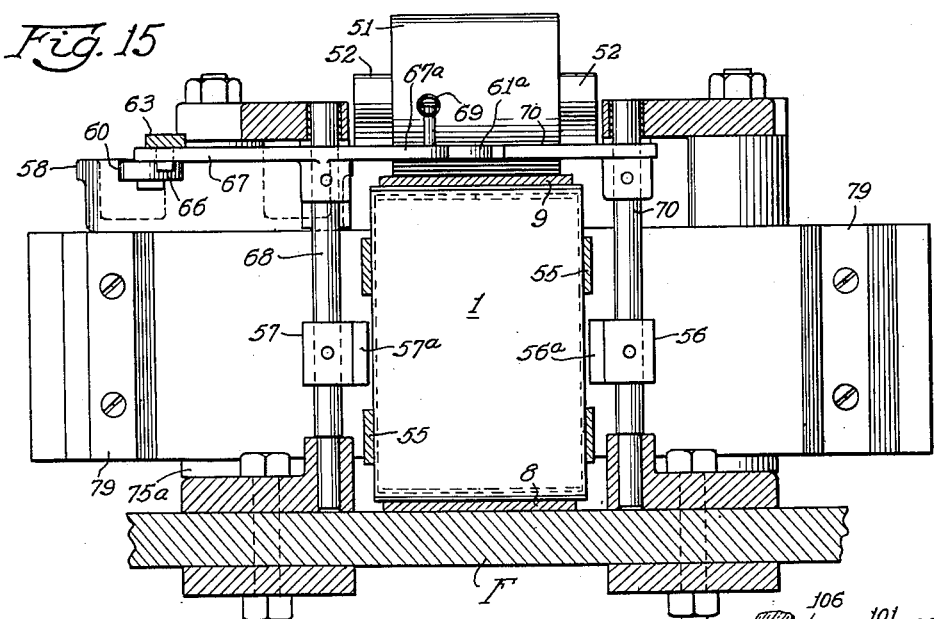
Figure 9:
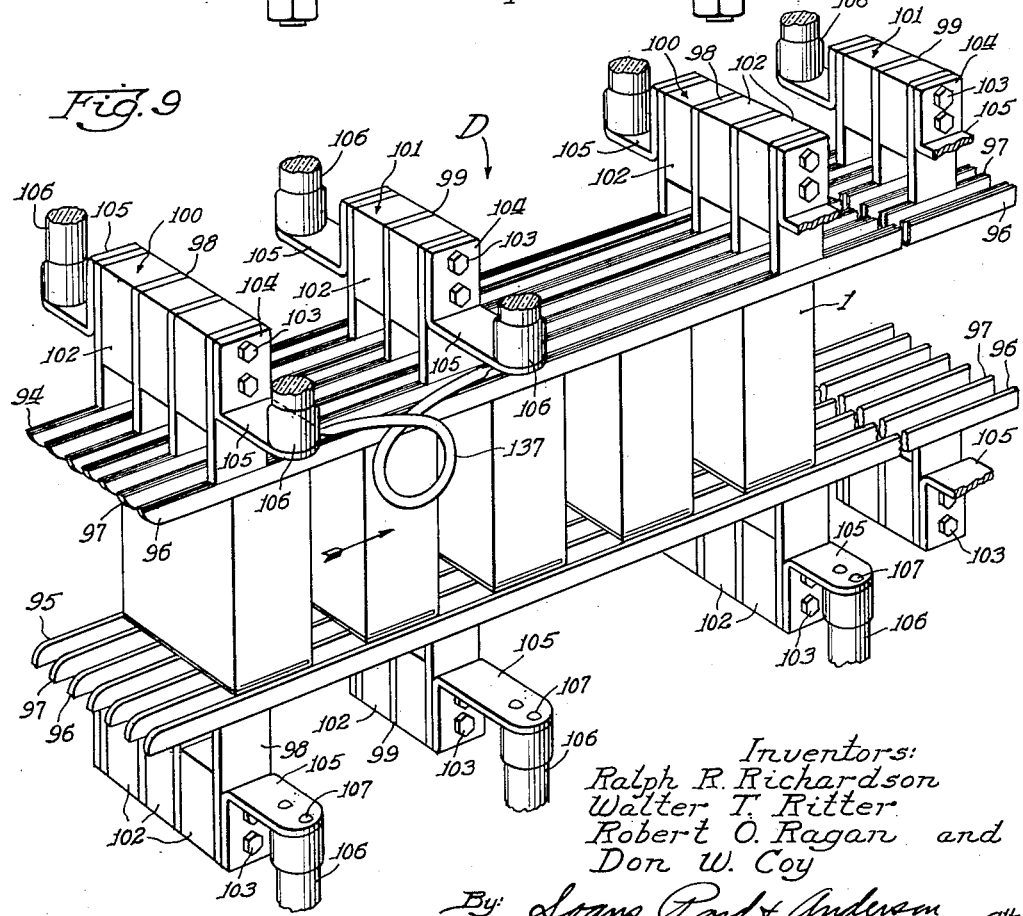
Figure 13:
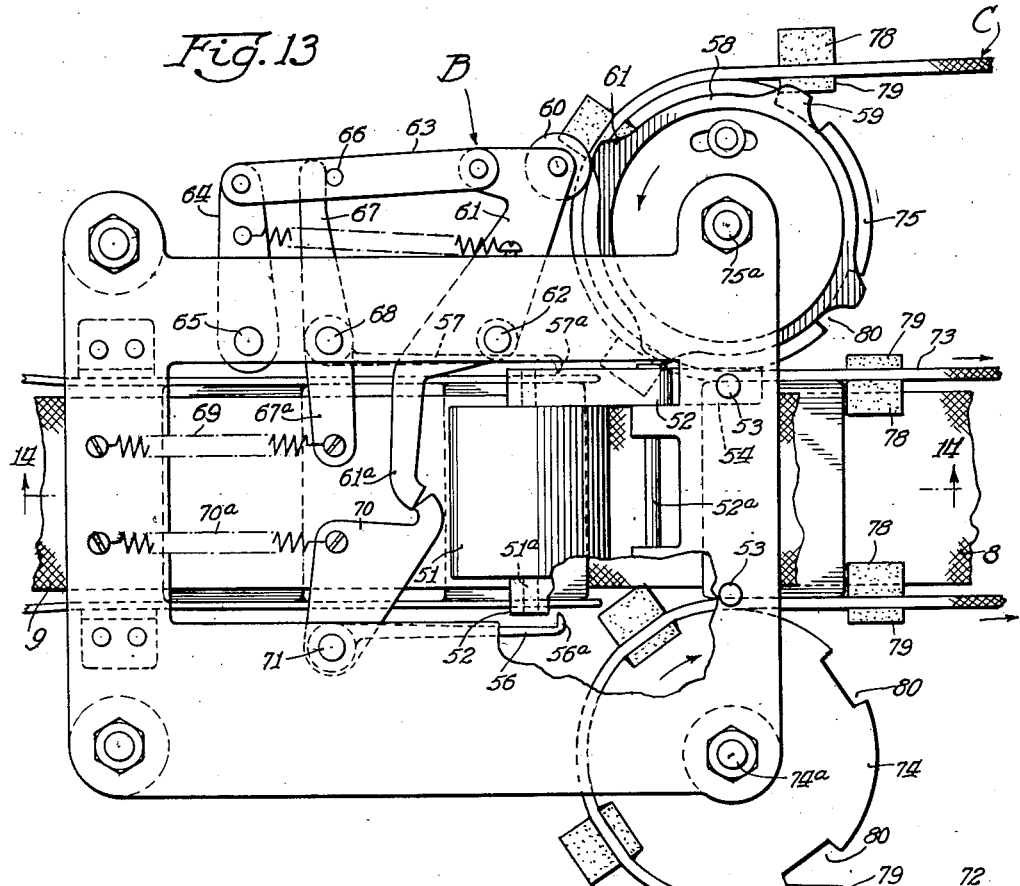
Figure 14:
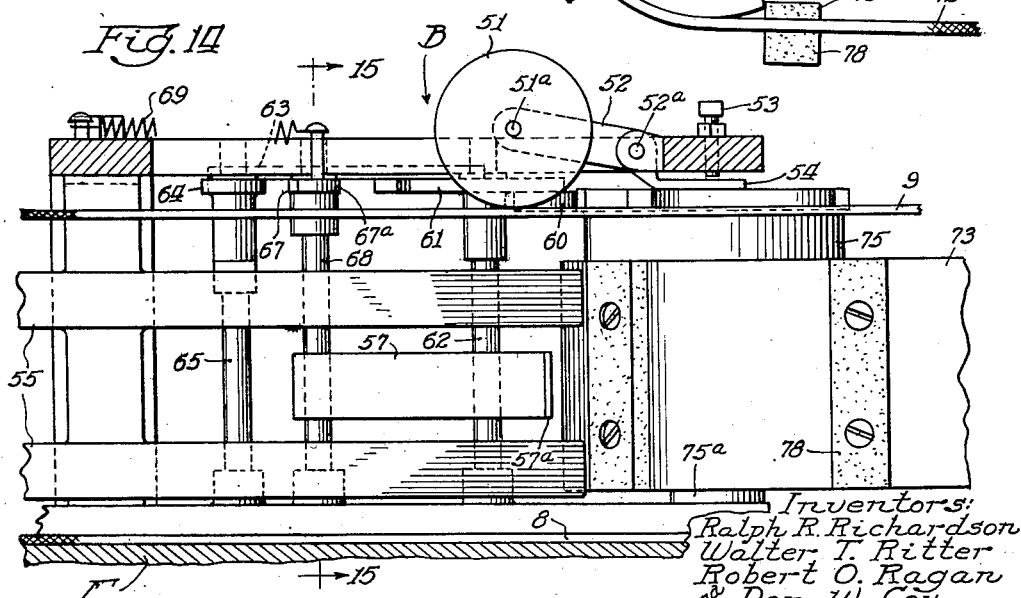
Figure 17:
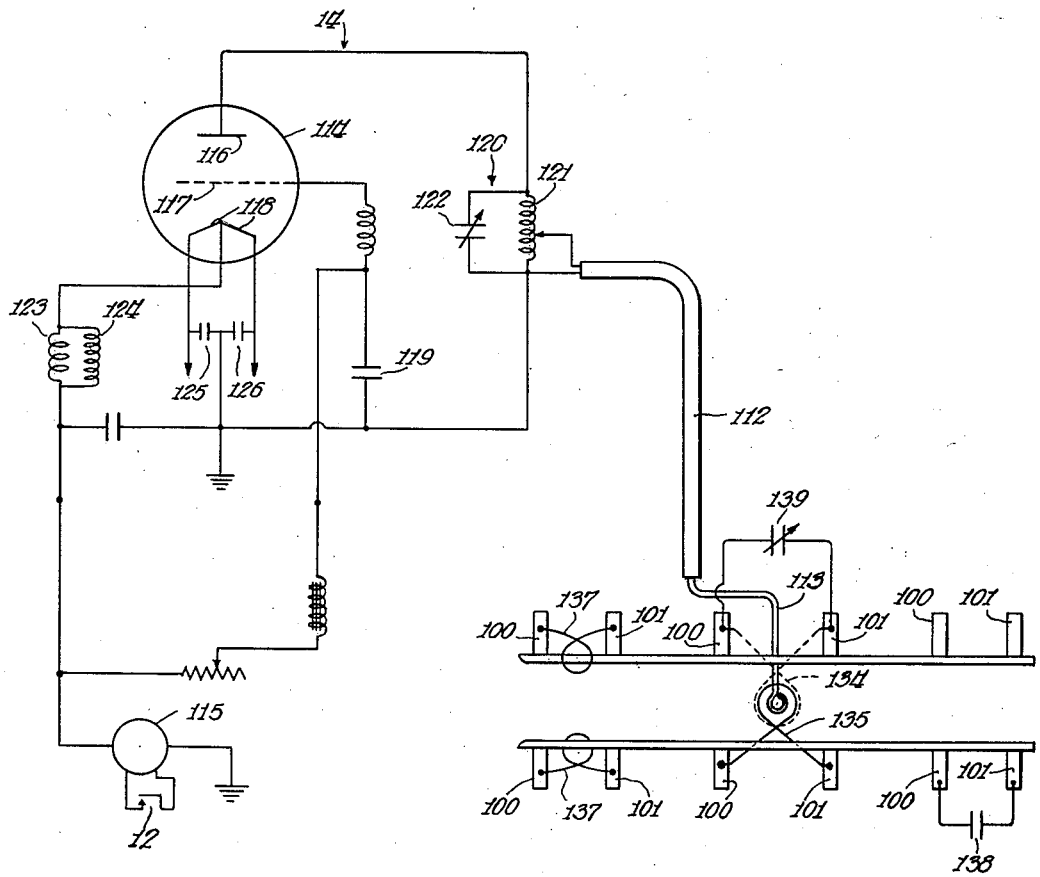

Figs. 4, 5 and 6 are transverse sections respectively on the lines 4—4, 5—5 and 6—6 of Fig. 1;

Fig. 7 is a fragmentary elevation on a plane indicated by the line 7—7 of Figs. 3b and 5;

Fig. 8 is a longitudinal section on the plane indicated by the line 8—8 of Figs. 3a and 4;

Fig. 9 is a fragmentary, perspective view of the high frequency electrodes which constitute the heating units of the apparatus;

Fig. 10 is a perspective of a carton adapted for sealing by the apparatus disclosed and described herein;

Fig. 11 is a transverse, sectional end view of the high frequency electrode structure;

Figs. 12a and 12b are side elevational views respectively of two types of electrodes which are embodied in the electrode structure;

Fig. 13 is a fragmentary plan view showing on an enlarged scale a portion of the mechanism which appears also in Fig. 3a;

Fig. 14 is a section on the line 14—14 of Fig. 13;

Fig. 15 is a section on the line 15—15 in Fig. 14;

Fig. 16 is a fragmentary plan corresponding to a portion of Fig. 13 but showing certain parts in a changed position, and Fig. 17 is a schematic diagram of an oscillation circuit employed with the dielectric heating circuit.

The carton sealing apparatus herein shown is operative to seal a conventional box or carton, such as is illustrated in Fig. 10, by the application of high frequency currents to the box surfaces to be sealed. The box comprises a generally rectangular form, having flaps at either end thereof, which are marginally coated with thermo-plastic substances in a predetermined manner and the flaps, when properly folded and heated, will effectively seal the ends of such box.

Each end of the box (Fig. 10) has a pair of end flaps 2—2 adapted to be folded inwardly over the end of the box from the opposite narrow side walls 3 thereof, and a pair of flaps 4 and 4a, which are hinged extensions of the wider side walls 5 and which are adapted to be folded successively inward over the side wall flaps 2—2. The flaps 2—2 may have thermo-plastic material 6 applied to their outer marginal portions, that is, to their marginal portions adjacent their hinge connection with the narrow side walls of the box. The flap 4 may have similar thermo-plastic adhesive material 7 applied to its outer marginal top surface adjacent its opposite ends and along the margin which borders its hinge connection with the side wall 5 from which it extends. The flap 4, as shown, may be folded inwardly in overlapping relation to the smaller flaps 2—2, and the flap 4a is adapted to be folded inwardly over the flap 4 to complete the closure of the box on one end.

By applying the adhesive material in the marginal areas, as indicated, the ends of the flap 4 will be effectively united with the flaps 2—2 when subjected to heat treatments so as to prevent gapping of the end closure between the ends of the flap 4 and the flaps 2—2. Similarly, by applying the adhesive 7 in the marginal areas indicated, the flap 4 will be united to the flap 4a around its otherwise free edges to effectively seal the box end. It will be observed that pressure applied to the top flap 4a to effect intimate face to face contact between the flap 4a and the flap 4 and between the flap 4 and the flaps 2—2, will act against the support afforded by the side walls of the box so that the underlying flaps will not be merely pushed away from the respective overlying flaps, but will resist such displacement so that effective contact may be made between the mutually overlapping flaps. Also, because of the peripheral support for the flaps, the adhesive material will disperse in several directions, some of it being thereby communicated into the corners of the box so as to effectively sift-proof the corners thereof. A fairly heavy coating of the adhesive material will best serve such purpose.

Boxes of the type indicated are normally supplied by the box maker in collapsed, flattened condition with the marginal edges coated in the manner described, the thermo-plastic coatings being in a hardened, dried condition. The boxes or packages may be expanded or distended to the position shown substantially in Fig. 10 and the flaps at either end of the box may be folded into mutually overlapping relation to close the box at such end. The material to be packaged may then be inserted into the box and the flaps on the open end of the box may be folded into mutually overlapping position to close the box ends, the box being then ready for sealing by the apparatus of the invention. The end flap folding and filling operations may be manual or automatic, the sealing apparatus being readily adapted for use with either type of operation.

In some cases, the boxes are furnished to the user without any adhesive material on the flaps. In such cases, the boxes, after being filled, are closed and sealed by equipment which applies a wet adhesive to portions of the end closure flaps and thereafter, folds the flaps with their wet coatings of adhesive into mutual overlapping relation. The apparatus of the invention may be employed to effect drying of the wet adhesive between the flaps so as to quickly produce a secure bond between the flaps.

Although a rectangular box has been shown in the illustration, the apparatus or some of the elements thereof, may be employed to seal other types of package or container structures or to seal toegther overlapped parts of other structures. The rectangular box has been illustrated as typifying a most common application of the invention and is not intended as a limitation on the scope of the invention.

The preferred embodiment of the automatic carton sealing machine, as shown particularly in Figs. 1, 2, 3a and 3b, comprises a supporting frame F (see Fig. 1) on which is mounted a carton advancing conveyor section A and a mechanical carton spacer mechanism B which operates to effect delivery of the cartons in spaced relation, one by one, to a pair of conveyors C (Fig. 3a). The conveyors C propel the cartons in uniformly spaced relation through a sealing section D (Figs. 1, 2 and 3a), which effects the flow of high frequency current through the end closures of the carton, the field of current flow which acts on the carton being so formed that it does not traverse the main body part of the carton or the content thereof, but is more or less confined to the thickness of the end closure. Another conveyor section E is mounted on said frame to receive the cartons from said sealing section and to conduct the cartons through means which applies pressure to the box ends during the setting period of the activated plastic material or other adhesive. The conveyor section E thereafter discharges the boxes into suitable receiving means.

The operating members of the machine described are driven by an electric motor, through a reduction gear unit G, suitable sprocket and chain drives, and gears as will presently be explained.

The supporting framework F comprises a series of horizontal, lateral members H which are stiffened and interconnected with transverse bracing members I and legs J, to form suitable support for the various parts of the machine. The framework is of metal but portions thereof which are located in the vicinity of the electrode arrangement, may be constructed of electrical non-conducting, non-metallic material, although conducting material may be used where the electrodes are positioned a sufficient distance from the framework to prevent the framework from adversely affecting the desired electrical current flow.

The conveyor section A comprises a pair of parallel, horizontally positioned belts 8 and 9. Boxes are fed between the stationary belts 8 and 9 in face to face relation and they are thereby advanced and carried past a pair of actuating arms 10 and 11 (Fig. 3a) of oscillator and motor switches 12 and 13. The actuating arms 10 and 11 are rocked outwardly by the boxes to close the switches and said switches are maintained closed so long as a steady stream of boxes continues to flow past said switch arms. Spring means (not shown) are operative to cause the contact arms 10 and 11 to return to their inwardly extending positions in the path of travel of the boxes, to thereby open the oscillator and motor switch 12 and 13 should the supply of boxes past the arms be discontinued.

Operation of the oscillator switch 12 closes the current supply to an oscillator 14 (Fig. 3a) to effect operation of the oscillator unit, which produces the required radio frequency electrical current. Closing of the switch 13 effects operation of motor 15.

The conveyor belts 8 and 9 are driven from a motor 15 (Fig. 1). This motor operates through a speed reduction unit 16, chain drive 17, sprocket 18, chain 19, and sprocket 20 to drive said sprocket 20. The sprocket 20 is carried by a bearing hub 21 (see Fig. 3b) which is rotatably mounted on a shaft 22 and is rotated independently of said shaft 22. Another sprocket 23 is also carried by said hub 21 as a unit therewith, and said sprocket 23 operates a chain 24 and sprocket 25 which is attached to a suitably journaled shaft 26 which is accordingly rotated. Shaft 26 carries sprocket 27 which drives a chain 28 and a sprocket 29 which is keyed to the said shaft 22, to thereby operate said shaft 22. The sprockets 27 and 29 are of like size so that the shafts 22 and 26 are driven at the same speed. Sprocket 25 is somewhat greater in diameter than sprocket 23 so that the speed of shaft 22 will be somewhat less than that of the hub 21 which is loosely mounted on the end thereof. By suitably changing one or the other of the sprockets 23 and 25, an adjustment of the driven speed of shafts 22 and 26 is readily attained.

A gear 30 is keyed to the shaft 22 and its teeth intermesh with the teeth of a gear 31 to drive the latter and the shaft 32 to which the gear 31 is keyed. The shaft 32 has secured to it, a sprocket 33 which drives a chain 34 which extends lengthwise of the apparatus to a sprocket 35 (Figs. 1 and 3a), which is secured to a shaft 35a suitably journaled in the supporting frame. The shaft 35a carries a gear 36 which, through the agency of intermediate gears 37 and 38, drives a gear 39 and a shaft 40 on which the gear 39 is secured. The sizes of the sprockets 33 and 35 are proportioned so that the speed of the driven gear 39 and shaft 40 will be somewhat greater than that of the driving shaft 32. The driven shaft 40 carries a pulley 41 and a belt 9 is trained around said pulley so as to be thereby driven.

The shaft 35a (Figs. 1 and 3) has secured to it, a gear 42, which acts through a chain 43 and a sprocket 44 to drive a shaft 45 at the same speed as the shaft 40. The shaft 40 carries a pulley 46 about which the lower conveyor belt 8 is trained so as to be driven. The pulleys 41 and 46 are of like diameter so that the belts 8 and 9 are driven at the same speed. The opposite ends of the belts 8 and 9 are carried by rollers 47 and 47a attached to shafts 48 and 49 respectively, the latter being suitably mounted in the supporting frame.

The belts 8 and 9 may be made of canvas or other suitable material and suitable means comprising, in this instance, belt guiding rolls 50 and 50a which are effective to maintain the lower belt 8 in a tightened condition to insure proper advancement of the boxes.

A pressure roller 51 (Figs. 1, 13 and 14) is horizontally disposed on shaft 51a which is mounted in suitable arms 52, the latter being pivotally mounted on suitable shafting 52a attached to a portion of the frame structure. The pressure roller 51, by reason of its heavy weight, acts through the belt 9 to exert pressure on the box tops as they pass therebeneath to cause the flaps of the box to be forced into and maintained in face to face engagement with each other. Stop bolts 53 threaded through a cross member of the frame F engage extensions 54 of the arms 52 to limit the extent of downward movement of the roller in the absence of a box. Box guides, such as 55, are mounted medially of the top and bottom of the boxes and extend longitudinally of the path of travel of the boxes between the belts 8 and 9 to insure advancement of the boxes along a predetermined path.

The box spacing arrangement B (Figs. 13, 14 and 15) is operated through a link arrangement to cause a pair of finger arms 56 and 57 to extend into the path of the advancing boxes, arrest the boxes in their forward movements, and periodically release one of the boxes for advancement by conveyor section A (belts 8 and 9) to the second conveyor section C of the apparatus. In order that the feeder mechanism may supply a steady supply of uniformly spaced boxes, the belts of the box supply conveyors 8 and 9 are operated at a slightly higher speed than the speed at which the belts of the succeeding conveyor section C are operated. The higher speed of the belts 8 and 9 will cause the boxes to group in the first conveyor section in closely assembled relation, awaiting their individual discharge into the second conveyor section by the extending finger arms 56 and 57. The weighted roll 51 helps to prevent displacement of the boxes when they are stopped by the hooks 56 and 57.

The box timing or spacing arrangement B (Figs. 13, 14 and 15) comprises the pair of hook-ended stop arms 56 and 57 pivotally mounted on opposite sides of the path of travel of the boxes between the conveyors 8 and 9. These arms 56 and 57 have end hooks 56a and 57a, respectively, which are adapted to be projected into the path of travel of the boxes to stop such travel. When the travel of the boxes is stopped in this manner, the belts 8 and 9 continue their travel but slip over the box ends. Timed rocking of the box holders 56 and 57, so as to release boxes at predetermined intervals or in selected spaced relation to each other, is effected by a rotating cam 58 which has a series of lobes 59 spaced uniformly around its circumference.

The cam 58 functions through a follower wheel 60 which is carried by an arm 61 that is mounted on a shaft 62, the latter being suitably journaled in the supporting frame structure (see Fig. 14). A link 63 (Fig. 13) is connected at one end to said arm 61 and at its other end to an arm 64 which is mounted on a suitably journaled shaft 65 (see also Fig. 14). The said link 63 is equipped with a depending pin 66 which engages the free end of a lever 67, the latter being mounted on a shaft 68 which also carries the hook arm 57 and is suitably journaled in the supporting frame structure. A spring 69, stretched between the lever arm 64 and a part of the frame structure, serves to normally maintain the cam follower 60 in operative engagement with the cam 58.

From inspection of Fig. 13, it will be evident that rocking movement imparted to the arm 61 by the cam 58 will be transmitted through the link-carried pin 66 to the arm 67, the shaft 68, and the hook finger 57 so as to rock the hook outwardly to release a box.

The arm 67 has an extension 67a (see Figs. 13 and 15) which is connected by a tension spring 69 to a part of the supporting frame structure. This spring 69 serves to yieldingly rock the shaft 68 in the direction required to urge the hook end of the arm 57 toward the boxes so that as soon as the cam 58 permits the arm 61 and link 63 to be retracted, the hook 57a will engage the side of the passing box and more or less snap into place in front of the next following box. The extent to which the hook 57a bears against the side of the box may be controlled by the length of the cam lobes 59 and should preferably be restricted to contact only a short portion of the width of the box immediately ahead of its trailing side. This avoids the necessity of extreme accuracy in the construction and timing of the cam and also difficulties in maintaining steady operation, especially in view of the normal irregularities in the widths of the boxes. The arrangement described causes the hook 57a to function properly even though the width of the boxes varies somewhat from time to time.

The hook 56 is similarly actuated through the agency of an extension 61a of the arm 61, the free end of said extension 61a being adapted to engage the free end of a rock arm 70 which is mounted on a shaft 71 suitably journaled in the frame structure and which shaft also carries the hook arm 56. A spring 70a is stretched between the arm 70 and a portion of the frame structure to normally urge the hook 56 to rock toward the boxes.

From an inspection of Fig. 13, it will be seen that the hook 56 is rocked outwardly simultaneously with the outward rocking of the hook arm 57, and that said hook 56 is yieldingly urged toward the adjacent side of the passing box simultaneously with inward movement of said hook arm 57. Hence, the hooks 56 and 57 are operated in unison to simultaneously engage the leading box adjacent its opposite sides so that the leading box will not only be stopped in its travel but also more or less squared to its line of travel.

The means whereby the cam 59 is continuously rotated will presently be explained.

The conveyors C (Fig. 3a) which receive the spaced boxes and propel them through the sealing section D, comprise a pair of vertically mounted, parallel belts 72 and 73 which are supported on drum rollers 74 and 75 at their receiving ends and 76 and 77 at their discharge ends. The receiving ends of the conveyors C are so related to the conveyor belts 8 and 9 as to be capable of receiving the boxes discharged by the belts 8 and 9 and continuing the travel of the boxes. The drum rollers 74 and 75 are fastened on vertical shafts 74a and 75a (Fig. 13) which are journaled in suitable bearings mounted on the framework F. The belts 72 and 73 are provided with a series of box pushing blocks 78 spaced to provide recesses for receiving the boxes in the aforesaid spaced relationship. Said pushers are attached to the belts by suitable fastenings which extend through reinforcing blocks 79 on the inside of the belts, and through the belts into the respective pushers. The pulleys or drum rollers 74, 75, 76 and 77 are provided with vertical, rectangular indentations or recesses 80 for receiving said reinforcing blocks 79 as the belts travel around said drum rollers.

The rollers 76 and 77 are driven so as to drive the belts 72 and 73. To that end, the pulleys 76 and 77 are mounted on vertically journaled shafts 81 and 82 (Fig. 5) respectively. These shafts have their lower ends connected by bevel gear drives 82—83 to a suitably journaled horizontal shaft 84 which is driven by a chain drive from the shaft 22 which is driven as already explained. The said chain drive (see Figs. 2 and 3b) consists of a chain 85 which is trained around sprockets 86 and 87 on the shafts 84 and 22 respectively.

Rotation of the rollers 76 and 77 will, of course, effect movement of the belts 72 and 73 in the proper direction to enable the same to receive and propel between them a succession of boxes delivered thereto by the spacer mechanism. The belts are, in effect, keyed to the driving rolls 76 and 77 so that they are maintained in proper registered relation to align their respective pushers 79 between the spaced boxes.

Release of the box by the finger arms 56 and 57 allows the conveyor belts 8 and 9 to carry the released box into the bight of the belts 72 and 73 in such synchronized relation to the positions of the pusher blocks 79 that pairs of the latter will engage behind the opposite side margins of the trailing wall of each box.

The conveyors 72 and 73 serve to continuously propel the boxes through the sealing section D. The boxes are also guided by frame supported upper and lower guide plates 88 and 89 into the zone of operation of the sealing section. Said plates serve to hold the flaps of the end closures in properly closed condition for delivering to said sealing section, and also serve to press any oversize boxes down to a size which will properly enter the sealing section. The conveyors 72 and 73 positively feed the boxes through the space between the guide plates 88 and 89 so that movement of the boxes between said plates will continue, even in the event of strong friction between the box ends and said plates.

In dielectric heating, the material to be heated is normally heated between two high voltage plates or electrodes which are arranged in the form of a capacitor, a high voltage being applied to the plates at the selected frequency to generate heat in the dielectric located between the plates.

In the present embodiment, a group of dielectric heating plates or electrodes are arranged to provide a field or path of high frequency current which is traversed by the box and closures to be sealed, but which does not extend, to any significant extent, through the content holding body portions of the boxes.

The electrode unit of the invention comprises an upper and lower electrode set 94 and 95 (Figs. 4, 8 and 9) between which the boxes are propelled with their end closures respectively in sliding contact with said electrode sets. Each set of the electrodes comprises a series of elongated, metal conductor bars 96 and 97 (Figs. 4 and 11) substantially U-shaped in cross section and arranged in horizontal, coplanar, spaced-apart relation to each other. A series of rectangular shaped flanges or bracket plates 98 and 99 extend from said bars 96 and 97 respectively, and have end portions positioned and soldered within the U-shaped section of the respective bars. The flanges are located at predetermined points spaced uniformly along the lengths of the electrodes.

One group of electrodes 96 has its plates 98 mounted substantially as shown in Fig. 12a and the second group of electrodes 97 has its plates 99 mounted substantially as shown in Fig. 12b.

The two different types of electrodes 96 and 97 (Figs. 12a and 12b) are alternately disposed in predetermined spaced relation to each other whereby the bracket plates 98 and 99 of the alternate bars will appear in transversely aligned groups 100 and 101 at predetermined points along the length of the electrode set. A series of copper spacing blocks 102 are interposed between the aligned bracket flanges and bolt and nut fastening means 103 may be extended through the aligned flanges and spacing blocks to fasten the electrodes in fixed assembled relation.

L-shaped supports 104 are connected to the outer flanges of each of the flange groups 100 and 101 with a portion 105 of the L-shaped support protruding outwardly of the electrodes to form suitable mounting means for the insulator holders 106. These insulators 106 comprise a rod of suitable dielectric material, the ends of the rods being provided with protective metal caps which are permanently attached to the rods. Each insulator 106 has one end fixedly connected to a support by suitable bolt fastening 107, and its other end connected by fastening 108 to a bed plate 109. The bed plate 109 is made of suitable insulating material and is rigidly interconnected with the frame structure F by fastening means 110. The electrode sets 94 and 95 are thereby adequately supported from the frame structure in relatively fixed relation to each other, the electrodes 97 being interposed between the electrodes 96 so that the center to center spacing of the electrodes 96 and 97 of each set 94 and 95, is substantially uniform.

The electrodes are preferably of U-shaped form in cross section, the bottom or horizontal portions being of arcuate form and the side legs being preferably longer than the width of the form so as to produce an electrode which is quite rigid against bending upwardly or downwardly under the vertical forces applied by the boxes. These elongated bars extend longitudinally of the path of travel of the boxes with the closed bottoms of the upper electrode sets 94 and the closed tops of the lower electrode set 95 in such planes that they engage the tops and bottoms respectively of the boxes which are propelled between said electrode sets.

The structure is electrically stable in that the insulator supports and the electrode arrangement combine to form a structure which results in a minimum of radio frequency loss to ground and a minimum loss due to stray capacitance.

The surfaces of the electrodes, which are in contact with the material to be sealed, present a curved and rounded outline to such material (see Fig. 11) thereby minimizing the amount of physical interference to the travel of the boxes or other material through the sealing section of the apparatus. Also, by arranging the electrodes in parallel relation to the path of the moving material to be sealed, the boxes or other material being acted on, ride over continuous, uninterrupted lengths of the electrodes, whereby smooth and steady movement of the boxes is assured. This electrode construction is especially adapted for use with the disclosed vertically mounted pusher belt conveying arrangement which propels the boxes through the space between the upper and lower electrode sets 94 and 95 in regularly spaced relationship whereby a substantially constant load is applied to the electrodes. The outer electrodes 96 of each electrode set 94 and 95 are preferably arranged slightly outwardly offset relative to the respectively adjacent side edges of the end closures so as to insure current flow through the corners of the moving boxes, and thereby to insure effective sealing at those points. If desired, the outer electrodes may be made of increased cross section so as to correspondingly increase the current flow at said edges. Such increased current flow will produce correspondingly increased heating of those portions.

The electrodes 96 and 97 of each set of electrodes are supplied with high frequency electric current from an oscillator 14 (diagrammatically represented in Fig. 4) by means of a coaxial cable 112 and an inductive coupling arrangement 113.

The oscillator 14 may be any one of a number of conventional, commercially available types. In this instance, the oscillator is represented in Fig. 17 as comprising an oscillator tube 114 having a tuned plate circuit for regulating the oscillator output. Power supply means for the oscillator may include a D. C. generator 115 controlled by the box actuated switch 12 (Figs. 3a and 17). The tube 114 comprises a plate 116, a grid 117 and a cathode 118. The plate is tied to ground and it is connected to the grid circuit 117 through a condenser 119 and a tank circuit 120. Feed back of energy from the plate to grid circuit is accomplished by the plate to grid inter-electrode capacity within the tube, that is, as a result of the small capacity inherent between the grid and plate elements in a tube. The capacitance becomes effective between the elements as the grid and plate are brought into resonance. The tank circuit 120 comprises an inductance 121 and a variable condenser 122 for stabilizing the oscillator performance. The cathode 118 is connected to the output terminals of generator 115, whereby the cathode is operated at a substantial voltage below ground. The generator power lead is connected through suitable radio frequency chokes 123 and 124 to the cathode filaments 118 and grounded condensers 125 and 126 cooperate with the chokes 123 and 124 to isolate the radio frequencies from the filaments 118. A coaxial cable 112 connects the oscillator output circuit and the inductive coupling unit 113, the coaxial cable 112 being effective to maintain the radiation losses in transmission at a minimum.

The inductive coupling arrangement 113 (see Figs. 4 and 8) comprises a mounting plate 127 of insulating material, horizontally and vertically adjustably mounted in a frame supported cross member 128 of insulating material. Clamping screws 129 serve to lock the plate 127 in selected position of adjustment. Close or fine adjustment of the plate is made by means of an adjusting screw 130 which is rotatably secured at one end to the plate 127 and is movable through a vertically elongated opening in a bracket 131 which is rigid with and depends from said cross member 128. A pair of nuts threaded on the screw 131 and located on opposite sides of said bracket 131 serve to lock the plate 127 in selected position of horizontal and vertical adjustment, it being observed that vertical elongation of the hole in the bracket 131 permits corresponding vertical adjustment of the position of the screw 130 and the plate 127. The vertical position of the plate 127 may also be determined by inserting or removing shims from between the upper end of the plate 127 and the cross member 128. The lower end of the mounting plate 127 supports the incoming coaxial cable 112 by suitable fastening means 132 which interconnects such coaxial cable 112 with the leads of the input coupling loop 133. The coupling loops or coil 133 is formed of fairly heavy copper wire rod, which is coiled to form the said input coil 133 and bent to provide leads 133a which are secured to said mounting plate 127 and electrically connected to the conductors of said coaxial cable 112. Said leads 133a are stiff enough to enable the same to adequately support the coil 133 from said plate 127.

The input coupling loop 133 is associated with coupling loops 134 and 135 of the upper and lower electrode sets respectively and the outside diameter of the input coil 133 is somewhat smaller than the inner diameters of said loops 134 and 135 so that the coil 133 may be adjusted inwardly and outwardly through the loops 134 and 135, and also laterally within the same to the most advantageous electrically coupled relationship to the same whereby the electrical energy supplied to the electrode sets 94 and 95 may be adjusted.

The coupling loops 134 and 135 are made of suitable conductor material and these loops are preferably fixedly mounted although they may be more or less readily adjustably mounted if desired whereby said electrical energy may be adjusted more or less independently for each of the electrode sets. The ends of the coupling loop 134 (Fig. 8) for the upper electrode unit, are connected to the middle set 100 and 101 of the vertically aligned mounting flanges or brackets 98 and 99 on the upper electrode set 94, one end being connected by suitable fastening means 136 to the flange group 100 which support the positive electrodes 96, and the other end being similarly connected to the flange group 101 which supports the negative electrodes 97. The lower electrode coupling loop 135 is connected in a similar manner to the middle positive and negative electrode flange groups 100 and 101 of the lower electrode set 95.

High frequency currents are transmitted from the oscillator 14 by means of the coaxial cable 112 and the inductive coupling arrangement 113 to the electrodes 96 and 97. High frequency currents will flow through the air gap between the box engaging edges of the electrodes in the sets 94 and 95, the path of these currents at least partially projecting outwardly from the plane of the said box engaging edges of said electrodes so that the end closures which slide along the respective electrodes, will traverse the projecting portions of said current fields. The end closures, including the adhesive material between the flaps which constitute said end closures will be heated as a result of the passage therethrough of the indicated radio frequency currents. If the adhesive material is of thermoplastic character, it will be rendered tacky and activated to adhesively bond the flaps together. If the adhesive is of a wet type, it will be more or less completely dried by the heat so as to effect said bonding of the flaps.

The described U-shaped form of the electrodes appears to cause the production of a somewhat concentrated flow of current in a shallow field outwardly of the planes of the electrodes. While concentration of the current flow in such field is desirable, it is by no means essential, the requirements of the apparatus being satisfied if there is enough a flow of current in such field to adequately heat the adhesive material between the flaps. By utilizing the said projected, shallow field of current flow as herein described, sealing of the box end closure is effected without subjecting the package contents to heating by the applied high frequency field. This is important in instances where the contents of the package are of a type which are or may be adversely affected by heat or high frequency electrical currents.

This use of the shallow, stray field of high frequency current is also important because it enables effective sealing to be accomplished while using a minimum of electric power when compared with the power which would be required if the entire depth or other side to side dimension of a box and its content is passed between electrodes and through an electrical field flowing from one of said electrodes to the other.

The box ends are subjected to the high frequency currents for a substantial interval of time, such time interval depending upon the material used in the box, the size of the box, the frequency applied, the conducting properties of the electrodes, etc., etc. The electrodes are elongated as already explained, and the speed of travel of the boxes along the electrodes is so determined that the heating currents will be applied to the box ends for the required length of time.

Standing wave effects encountered in the use of long electrodes and higher frequencies, tend to interfere with the maintenance of a uniform voltage gradient over the entire electrode length. This difficulty, if encountered, may be overcome by known means, such as inductances 137 connected across the end positive and negative mounting flange groups 100 and 101 of both the upper and lower electrode sets 94 and 95. In this manner, tuned sections having a somewhat shorter electrical length are created and any objectionable standing wave effect is eliminated.

The provision of the inductive loops 137 serves the purpose of enabling electrodes to be resonated at a higher frequency without loss of power in the electrode. This is not possible by other means due to poor coupling of the necessarily smaller loops 113, and due to increase in the standing wave ratio.

A pair of condensers 138 and 139 are employed in parallel with the capacitance of each of the electrode sets 94 and 95 to permit each electrode to be brought to peak resonance at the same frequency. In the illustrated embodiment, a fixed capacitance 138 is employed in parallel with the lower electrode unit and a variable condenser 139 is paralleled with the fixed capacitance of the upper electrode set. When only the upper end of a box is to be sealed, the lower electrode set is shorted out or disconnected, and the variable condenser 139 may be used to continuously tune the upper electrode set 94 to peak resonance. This arrangement is preferable to adjusting the oscillator condenser. Operation of the condenser may be automatic or manual, automatic control (not shown) being preferable. Load changes occurring when simultaneously sealing opposite ends of cartons are compensated by adjustment of the master oscillator variable capacitor.

During the travel of the boxes between the electrode sets 94 and 95, propelling force is applied to the respective boxes or cartons by the pusher blocks 78 and light pressure is applied to the top and bottom ends of the boxes by the upper and lower electrode sets 94 and 95 so as to place the seal line or plane uniformly within the radio frequency field of the electrodes; however, the application of excessive pressure should be avoided so as to facilitate travel of the boxes between said electrodes.

Suitable belt guides 140 for the operative reach of the belt 72, and 141 and 142 for the operative reach of the belt 73, are provided to maintain the belts 72 and 73 against the sides of the traveling boxes to prevent collapsing or bulging of the boxes and thereby to maintain the upper and lower ends of the box in firm face contact with the electrodes 94 and 95. These belt guides or supports are preferably formed of material having a high dielectric constant.

The operative reaches of the belts 72 and 73 are more or less supported against objectionable sagging by the electrode supported boxes through the agency of the cleats or pushers 78 which maintain a tight fit against the boxes and are thereby held against such tilting as would normally occur if the belt sagged. The return or outer reaches of said belts may be supported against sagging by suitable shelf-like supporting strips 143 and 144 respectively, these supports being formed of suitable dielectric material and mounted on the frame structure of the machine.

The movement of belts 72 and 73 carries the boxes through the electrode sets 94 and 95 and between a pair of low dielectric loss guide shoes 149 and 150 (Figs 1 and 6), which bridge the space between the box discharging ends of the electrode sets and the conveyor section E. The shoes are positioned by means of pairs of stationary, frame carried mounting rods 151 which extend through suitable openings in the shoes. The lower shoe is normally fixed with its top face substantially coplanar with the plane of the operative edges of the lower electrode set. The upper shoe is vertically slidable on said rods 151, being normally urged downwardly by springs 152 around the rods 151 and held against displacement by retaining nuts 153 on the upper ends of said rods. In this manner, the end surfaces of each box are maintained in tight surface relation with each other during the transfer of the boxes to the pressure of conveyor section E where the boxes are held closed for sufficient time to permit cooling and setting of the activated thermoplastic material. The shoes 149 and 150 are of such width that they normally engage at least two boxes so that the upper shoe is always supported at such an elevation that oncoming boxes may enter between the shoes. The receiving edges of said shoes are preferably flared somewhat to facilitate entrance of the boxes between the shoes.

The conveyor section E comprises horizontally, extending parallel, upper and lower belts 154 and 155, respectively (Figs. 1 and 2). The belt 154 is mounted on rollers 156 and 157 (Fig. 1) which are mounted on shafts 158 and 26 respectively, the roller 157 being fixed to the shaft 26 which is driven as already explained, whereby said belt 154 is also driven. The lower belt 155 is mounted on rollers 159 and 160 which are carried by shafts 161 and 32, respectively, the roller 160 being fixed to said shaft 32 which is driven, as already explained, whereby said lower belt 155 is also driven. The upper reach of the lower belt is supported by an underlying supporting plate 161 which is suitably mounted on the frame structure. The lower reach of the upper belt 154 is maintained in close contact with the upper ends of the moving boxes by a series of pressure rollers 162 and 163 which are disposed between suitable side keeper plates 164. The keeper plates are supported by means of suitable frame brackets, as shown in Fig. 5, and the rollers 162 have axial end projections mounted in vertical slots in the keeper plates so as to permit the weight of the rollers 162, and the weight of the free, superposed rollers 163, to be communicated to the boxes through the belt material. In this manner the box end flaps are held together while the adhesive is setting, the boxes being also maintained constantly in motion in continuation of their normal travel through the apparatus. Additional rollers may be added and spaced along the length of the belt as desired, the keeper plates extending approximately the length of the belts 154 and 155. The belts 154 and 155 are preferably of rubber or other resilient material to effect a close conformation to the carton ends and to effect an even and uniform distribution of the pressure roller weight components. Setting of the thermoplastic material may be accelerated by directing a cooling air current to flow around the boxes, for which purpose there may be provided a blower 165, driven by a motor 166, and a conduit 167, as shown in Fig. 3b.

The length of conveyor section E is made to satisfy the period required for the setting of the activated thermoplastic material on the box surfaces. Suitable automatic packaging or other means may be located at the discharging end of the conveyor section E for receiving the sealed cartons as they are discharged from said conveyor section E.

The described electrode arrangement for applying high frequency currents simultaneously and uniformly to opposite ends of each of a succession of continuously traveling boxes is highly efficient while being of relatively simple construction, and it makes possible rapid and clean box sealing in an economical manner with a minimum amount of danger of machine interruptions or breakdowns.

The mechanisms for effecting delivery of the boxes into regularly spaced relationship for passage through the electronic system, effectively cooperates with the latter in that the regular spacing of the boxes aids the electronic system to function uniformly on all of the boxes so that uniform sealing results are effectively obtained by the mechanism.

The apparatus is of simple and economical construction and at the same time rugged and durable in use.

Variations and modifications in the details of structure and arrangement of the parts may be resorted to while retaining the principles of the invention.

We claim:

1. In apparatus for sealing end closures embodying a plurality of mutually overlapping flaps having adhesive material therebetween, said apparatus comprising a pair of elongated, transversely spaced electrodes having coplanar face portions, means for propelling a series of said packages lengthwise along said electrodes, means spaced from and paralleling said electrodes for holding said series of boxes in sliding engagement with said electrodes with said end closures engaging the electrodes, means for supplying radio frequency electric current to said electrodes to create a current path through the gap between said electrodes and through said end closures, the width of the space between said electrodes being greater than the corresponding dimension of said electrodes, whereby only small portions of the areas of said end closures engage said electrodes and frictional resistance to movement of the packages is maintained low, and whereby the electrodes are given high resistance to bending under the force applied thereto for holding the box end closures in engagement with said electrodes.

2. In apparatus for sealing end closures embodying a plurality of mutually overlapping flaps having adhesive material therebetween, said apparatus comprising a plurality of elongated, transversely spaced, coplanar electrodes, alternate electrodes being electrically interconnected, means for propelling a series of said packages lengthwise along said electrodes, means spaced from and paralleling said electrodes for holding said series of boxes in sliding engagement with said electrodes with said end closures engaging the electrodes, means for supplying radio frequency electric current to said electrodes to create current paths through the gaps between adjacent electrodes and through said end closures, the total width of all of said gaps being greater than the total width of the areas of engagement between the end closures and said electrodes and being but slightly less than the corresponding dimension of said end closures, whereby frictional resistance to movement of the packages is maintained low.

3. In apparatus for sealing container end closures which embody mutually overlapping flaps having adhesive material therebetween, said apparatus comprising a pair of elongated, transversely spaced electrodes, means for propelling said containers along said electrodes with said end closures adjacent to said electrodes, means for supplying radio frequency electric current to said electrodes so as to cause such current to flow from one of said electrodes to the other and through the end closures of containers propelled along said electrodes as aforesaid, said electrodes comprising metal conductor bars of U-shaped cross section having base portions provided with outside faces of convexly arcuate form disposed in coplanar relation for sliding engagement by said end closures, the transverse space between said electrodes being greater than the corresponding transverse dimension of the area of said sliding engagement.

4. In a method of sealing a box closure which embodies a plurality of mutually overlapping flaps having adhesive material therebetween, the step of propelling the flap formed closure portion of the box through a plurality of substantially parallel fields of high frequency electric current which fields are each elongated in the direction of movement of the boxes and of narrow width relative to the corresponding dimension of said closure, and which fields are in substantially side by side relationship so as to cooperatively subject substantially the entire area of said closure to the heating effect of high frequency current.

5. Apparatus for sealing a container end closure which embodies mutually overlapping flaps of dielectric material having adhesive material therebetween, said apparatus comprising a pair of elongated, transversely spaced electrodes having a pair of co-planar surfaces, means for propelling a plurality of said containers in succession longitudinally of said electrodes with the end closures of said containers substantially parallel to the plane of said co-planar electrode surfaces and closely adjacent to said plane, said electrodes being connectable to a source of high frequency electrical current and being operative to generate between them, an uninterrupted, elongated field of high frequency current flow with a stray field which will extend in the planar direction of and pass through the end closures of containers propelled as aforesaid, the divergence of said stray field from the normal field between said electrodes being normally of such limited extent as to avoid significant action on material packaged within the containers, whereby said adhesive material will be caused to seal said flaps in said overlapping relationship without incidentally affecting the contents of said containers.

6. Apparatus for sealing a container end closure which embodies mutually overlapping flaps of dielectric material having adhesive material therebetween, said apparatus comprising a pair of elongated, transversely spaced electrodes having a pair of coplanar surfaces, means for propelling a plurality of said containers in succession longitudinally of said electrodes with the end closures of said containers substantially parallel to the plane of said co-planar electrode surfaces and closely adjacent to said plane, said propelling means being operative to maintain a predetermined number of said containers simultaneously and constantly in said relationship to said electrodes within the lengths thereof so as to maintain constant, substantially uniform electrical loading of said electrodes, said electrodes being connectable to a source of high frequency electrical current and being operative to generate between them, an uninterrupted, elongated field of high frequency current flow with a stray field which will extend in the planar direction of and pass through the end closures of containers propelled as aforesaid, the divergence of said stray field from the normal field between said electrodes being normally of such limited extent as to avoid significant action on material packaged within the containers, whereby said adhesive material will be caused to seal said flaps in said overlapping relationship without incidentally affecting the contents of said containers.

7. Apparatus for sealing a container end closure which embodies mutually overlapping flaps of dielectric material having adhesive material therebetween, said apparatus comprising a pair of sets of elongated electrodes having surface portions disposed substantially in co-planar relationship, the electrodes of one of said sets being arranged in alternated, transversely spaced relation to those of the other set, means for propelling a plurality of said containers successively longitudinally along said electrodes with the end closures of said containers substantially parallel to said co-planar surfaces and closely adjacent thereto and normally operative to constantly maintain a predetermined number of said containers in said relationship to said electrodes within the lengths thereof so as to maintain substantially constant, uniform electrical loading of said electrodes, said electrodes being operative when connected to a source of high frequency electrical current, to generate a plurality of elongated, narrow, mutually adjacent fields of high frequency current flow extending uninterruptedly in the direction in which the containers are propelled as aforesaid, said fields being attended by stray fields which extend in the planar direction of and pass through the end closures of containers propelled as aforesaid, the divergence of said stray fields from the normal fields between said electrodes being normally of such limited extent as to avoid significant electrical effect on material packaged within the containers, whereby said adhesive material will be caused to seal said flaps in said overlapping relationship without incidentally affecting the contents of the containers.

8. In apparatus for sealing container end closures which embody overlapping flaps having adhesive material therebetween, container supply means comprising a pair of conveyors arranged relative to each other to provide a pair of parallel reaches adapted to receive between them, containers having end closures as aforesaid, the ends of the containers being respectively disposed adjacent said parallel conveyor reaches, means for driving said conveyors so as to cause said parallel reaches to travel in the same direction for advancing the containers received therebetween, container propelling means adapted to receive the containers from said supply conveyors to continue the travel of said containers, said propelling means comprising a pair of conveyors arranged relative to each other to provide a pair of parallel reaches adapted to receive between them the containers advanced by said supply conveyors, said propelling conveyors being arranged normally to said supply conveyors so that the side walls of said containers which are normal to said end walls will be disposed respectively adjacent said propelling conveyor reaches, and a closure sealing device comprising a pair of normally fixed, elongated members arranged respectively in substantially co-planar relation to the parallel reaches of said supply conveyor for engaging the ends of the containers while the latter are advanced by said propelling means, said propelling conveyor having its receiving end portion longitudinally overlapping the discharge end portion of said supply conveyors to effect transfer of the containers from said supply conveyors to said propelling conveyors.

9. In apparatus for sealing container end closures which embody overlapping flaps having adhesive material therebetween, container supply means comprising a pair of conveyors arranged relative to each other to provide a pair of parallel reaches adapted to receive between them, containers having end closures as aforesaid, the ends of the containers being respectively disposed adjacent said parallel conveyor reaches, means for driving said conveyors so as to cause said parallel reaches to travel in the same direction for advancing the containers received therebetween, container propelling means adapted to receive the containers from said supply conveyors to continue the travel of said containers, said propelling means comprising a pair of conveyors arranged relative to each other to provide a pair of parallel reaches adapted to receive between them the containers advanced by said supply conveyors, said propelling conveyors being arranged normal to said supply conveyors so that the side walls of said containers which are normal to said end walls will be disposed respectively adjacent said propelling conveyor reaches, a closure sealing device comprising a pair of normally fixed elongated members arranged respectively in substantially co-planar relation to the parallel reaches of said supply conveyors for engaging the ends of the containers while the latter are advanced by said propelling conveyors, and end closure pressing means comprising a pair of mutually opposed conveyors having adjacent reaches arranged respectively in co-planar relation to said fixed elongated members of said sealing device and operative to receive said containers and to engage and supply pressure to the ends of the containers, said propelling conveyor having its receiving and discharge end portions respectively longitudinally overlapping the discharge and receiving end portions of said supply conveyors and said closure pressing conveyors to effect transfer of the containers from said supply and propelling conveyors respectively to said propelling and end pressing conveyors.

10. Apparatus of the class described comprising means for propelling containers having upper end closures which embody overlapping flaps having thermoplastic adhesive material therebetween, a heating device operable on said upper end closures for reactivating said adhesive material during the advancement of the containers by said propelling means, vertically aligned upper and lower driven conveyors having their lower and upper reaches disposed in cooperating parallel relationship to receive said containers from said propelling means after the containers have been propelled along said heating means, said parallel conveyor reaches being so spaced from each other as to locate the lower reach of the upper conveyor in close proximity to the plane of travel of the upper end closures of said containers, and a plurality of vertically movable weighting means spaced lengthwise of and resting on the flap holding reach of said upper conveyor so as to urge the underlying portions of said conveyor reach against the underlying upper end closures of the containers to thereby hold said upper end closure flaps tightly closed during the travel thereof between said upper and lower conveyors.

11. In apparatus for sealing container end closures which embody overlapping flaps having thermoplastic adhesive material therebetween, means for propelling such containers, heating means for reactivating said adhesive material in the course of travel of the container while propelled by said propelling means, a conveyor operative to receive the containers from said propelling means after said adhesive is reactivated as aforesaid, means for applying pressure to said closure flaps to maintain the same in closed position during the travel of said containers on said conveyor, and means for directing a flow of air around the containers on said conveyor to accelerate the setting of said adhesive material.

12. In apparatus for sealing a package end closure which embodies mutually overlapping flaps having adhesive material therebetween, said apparatus comprising a pair of elongated electrodes disposed in transversely spaced relationship to each other and having a pair of substantially parallel, coplanar faces, a source of radio frequency current connected to said electrodes to cause radio frequency current to flow through the gap between said electrodes and a stray field of such current to be formed adjacent to said gap, means for propelling the package along said electrodes with the outer face of said end closure in parallel relation to the plane of said electrode faces and adjacent thereto, whereby said end closure is propelled through said stray field of current flow in a direction extending crosswise of the direction of said current flow.

13. In apparatus for sealing a package end closure which embodies mutually overlapping flaps having adhesive material therebetween, said apparatus comprising a plurality of elongated electrodes disposed in transversely spaced relationship to each other and having substantially parallel, coplanar faces, alternately disposed electrodes being electrically interconnected so as to provide a plurality of parallel, elongated, coplanar gaps between said electrodes, a source of radio frequency current connected to said electrodes so as to cause radio frequency current to flow across said gaps, and means for propelling the package along said electrodes with the outer face of said end closure in parallel relation to and adjacent the co-planar faces of said electrodes, whereby said end closure will be moved through stray fields of said current flow across said gaps, and in a direction which extends crosswise of the direction of said current flow.

14. In apparatus for simultaneously sealing end closures on opposite ends of a package, said end closures each embodying mutually overlapping flaps having adhesive material therebetween, said apparatus comprising a pair of elongated electrode assemblies spaced from each other a distance substantially corresponding to the distance between the opposite ends of the package to be sealed, each assembly having at least a pair of elongated electrodes disposed in spaced relationship to each other, a source of radio frequency current, means for connecting said source to said electrode assemblies so as to cause radio frequency electric current to flow from one electrode of each assembly to another electrode of the same assembly, and means for propelling said package along the lengths of said electrodes between said assemblies thereof with said end closures respectively adjacent said electrode sets.

15. In apparatus for simultaneously sealing end closures on opposite ends of a package, said end closures each embodying mutually overlapping flaps having adhesive material therebetween, said apparatus comprising a pair of elongated electrode assemblies spaced from each other a distance substantially corresponding to the distance between the opposite ends of the package to be sealed, each assembly having at least a pair of elongated electrodes disposed in transversely spaced relationship to each other and having coplanar face portions, a source of radio frequency current, means for connecting said source to said electrode assemblies so as to cause radio frequency electric current to flow from one electrode of each assembly to another electrode of the same assembly, a conveyor for simultaneously propelling a predetermined number of said packages in uniformly spaced relation along said electrodes in the space between said assemblies thereof with the end closures of said packages disposed adjacent the planes of the coplanar faces of the electrodes of the respective assemblies thereof, and means for delivering said packages one by one to said conveyor and into said uniformly spaced relation so as to constantly maintain said predetermined number of packages on said conveyor and thereby to cause a substantially constant electrical load to be constantly applied to the electrical circuits of said electrode assemblies.

16. In apparatus for sealing container end closures which embody overlapping flaps having adhesive material therebetween, said apparatus comprising an electrode assembly having a plurality of elongated electrodes disposed in substantially coplanar, parallel, transversely spaced relationship to each other, a plurality of mounting flanges extending from each of said electrodes at predetermined intervals along its length, the flanges of alternate electrodes being located in transversely aligned relationship and those of the remaining electrodes being located at points along the lengths thereof which are spaced lengthwise along the electrodes from the points at which the flanges of said alternate electrodes are located, means mechanically and electrically interconnecting the electrodes of the respective groups, and non-conductor supporting means to which the mounting flanges of each group of electrodes are secured for supporting said groups.

17. In a method of sealing a box closure which embodies a plurality of mutually overlapping flaps having adhesive material therebetween, the step of propelling the flap formed closure portion of the box through a high frequency electric current field which is elongated and continuous in the direction of movement of the box and in which the current flows crosswise of the direction of box movement.

RALPH R. RICHARDSON.
WALTER T. RITTER.
ROBERT O. RAGAN.
DON W. COY.

REFERENCES CITED

The following references are of record in the file of this patent:

UNITED STATES PATENTS

| Number | Name | Date |
|---|---|---|
| 2,288,269 | Crandell | June 30, 1942 |
| 2,346,776 | Malhiot | Apr. 18, 1944 |
| 2,388,824 | Brown | Nov. 13, 1945 |
| 2,397,615 | Mittelmann | Apr. 2, 1946 |
| 2,479,290 | Auxier | Aug. 16, 1949 |
| 2,480,501 | Moore | Aug. 30, 1949 |
| 2,555,874 | Coughlin | June 5, 1951 |

FOREIGN PATENTS

| Number | Country | Date |
|---|---|---|
| 599,023 | Great Britain | Mar. 3, 1948 |
| 609,526 | Great Britain | Oct. 1, 1948 |